United States Patent
Lee

(10) Patent No.: US 7,861,429 B2
(45) Date of Patent: Jan. 4, 2011

(54) THICKNESS GAUGE

(75) Inventor: Chia-En Lee, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 100 days.

(21) Appl. No.: 12/327,495

(22) Filed: Dec. 3, 2008

(65) Prior Publication Data

US 2009/0307919 A1 Dec. 17, 2009

(30) Foreign Application Priority Data

Jun. 13, 2008 (CN) ............................ 200810302126

(51) Int. Cl.
*G01B 3/50* (2006.01)
(52) U.S. Cl. ..................... 33/501.45; 33/832; 33/562
(58) Field of Classification Search .............. 33/501.05, 33/501.08, 501.45, 562, 567, 832, 836
See application file for complete search history.

(56) References Cited

U.S. PATENT DOCUMENTS

| | | | |
|---|---|---|---|
| 1,881,651 A * | 10/1932 | Judge | 33/562 |
| 2,191,105 A * | 2/1940 | Cutler et al. | 33/507 |
| 4,138,820 A * | 2/1979 | O'Connor | 33/562 |
| 4,150,488 A * | 4/1979 | Behnke | 33/567 |
| 4,169,319 A * | 10/1979 | Gardner | 33/834 |
| 5,253,427 A * | 10/1993 | Bartlett | 33/501.08 |
| 5,285,578 A * | 2/1994 | Sovereen | 33/567 |
| 6,594,914 B1 * | 7/2003 | Babcock | 33/563 |
| 6,904,690 B2 * | 6/2005 | Bakke et al. | 33/501.45 |
| 6,981,332 B2 * | 1/2006 | Barefoot | 33/501.45 |
| 2005/0044739 A1 * | 3/2005 | Blouch | 33/562 |
| 2008/0276475 A1 * | 11/2008 | Schafer | 33/501.45 |

FOREIGN PATENT DOCUMENTS

| | | |
|---|---|---|
| CN | 200950045 Y | 9/2007 |
| CN | 201014949 Y | 1/2008 |
| JP | S57-96205 A | 6/1982 |

* cited by examiner

*Primary Examiner*—G. Bradley Bennett
(74) *Attorney, Agent, or Firm*—Steven M. Reiss

(57) ABSTRACT

A thickness gauge (10) includes a main body (12), a plurality of measuring portions (14) defined along an edge of the main body (12), each measuring portion (14) having a different height, and a numerical pattern corresponding to the height of the measuring portion (14). The thickness gauge (10) only has one main body (12), so the material for making the measuring portions (14) can be reduced. Further more, the thickness gauge (10) is small, and easy to carry.

4 Claims, 3 Drawing Sheets

THICKNESS GAUGE

BACKGROUND

1. Field of the Invention

The present invention relates to a thickness gauge.

2. Description of Related Art

Currently, a variety of measuring tools are used in electronic and mechanical fields to measure dimensions of products, such as thickness gauges, beam calipers, Johnson gauge blocks, internal gauges, external gages, etc. Due to their high accuracy, thickness gauges are widely used to measure gap distances between components.

However, thickness gauges are usually large in volume, which makes them inconvenient to carry. In addition, the thickness gauge has many measuring portions such that the cost for making this kind of thickness gauge is high.

Therefore, there is room for improvement within the art.

DETAILED DESCRIPTION OF THE EXEMPLARY EMBODIMENTS

Figure 1:
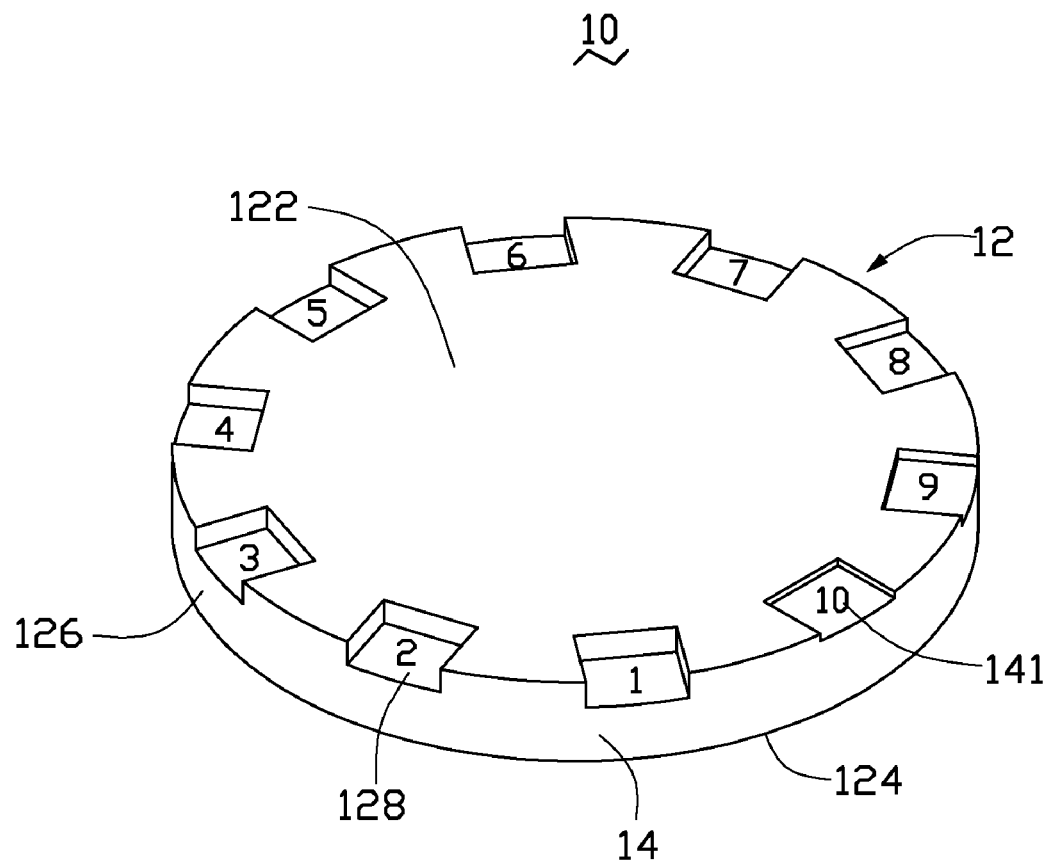
FIG. 1 shows a schematic view of an exemplary embodiment of a thickness gauge.

Referring to FIG. 1, a thickness gauge 10 according to an exemplary embodiment is shown. The thickness gauge 10 includes a main body 12. The main body 12 may have a variety of shapes, for example, substantially disc-shaped, and may be made of materials such as metal and plastic. The main body 12 includes an upper surface 122, a lower surface 124 opposite to the upper surface 122, and a peripheral surface 126 connecting the upper surface 122 to the lower surface 124. The upper surface 122 defines a plurality of equally spaced slots 128 radially distributed along the edge. The depths of each slot 128 orderly increase, so a plurality of measuring portions 14 with different heights between the bottom of each slot 128 and the lower surface 124 are formed. Each of the measuring portions 14 has a numerical pattern 141 formed thereon designating the height of a corresponding one of the measuring portions 14.

Figure 2:
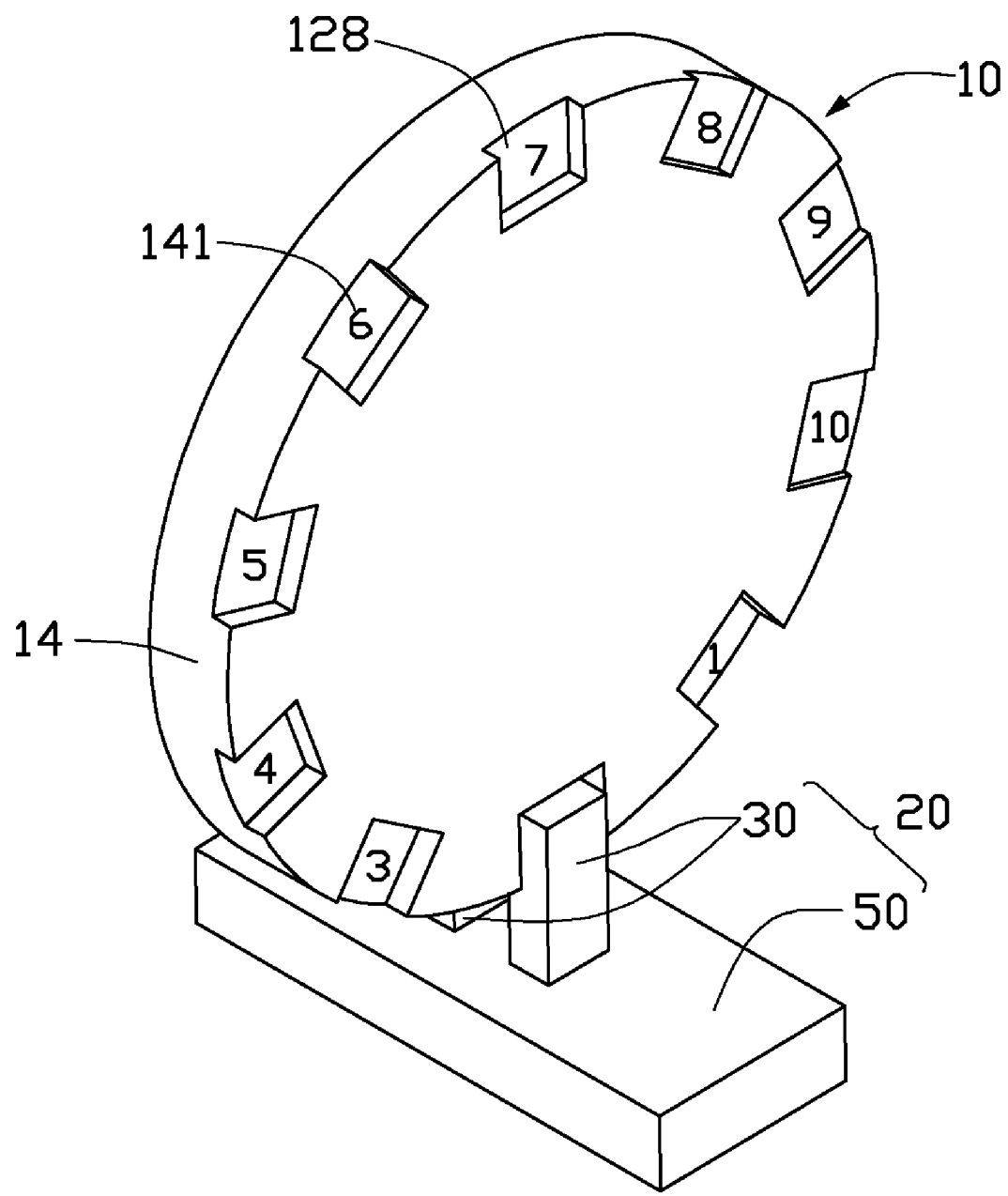
FIG. 2 shows a schematic view of the thickness gauge measuring a gap between two supporting posts.

Referring to FIG. 2, a method of using the thickness gauge 10 to measure a workpiece 20 may include the following steps:

The workpiece 20 includes a substrate 50 and two supporting posts 30 positioned on the substrate 50. The supporting posts 30 have a gap therebetween. The measuring portions 14 are orderly inserted into the gap between the two supporting posts 30 by rotating the main body 12 of the thickness gauge 10. When one of the measuring portions 14 becomes tightly inserted into the supporting posts 30, the numerical pattern associated with the tightly inserted measuring portion corresponds to the gap distance.

Figure 3:
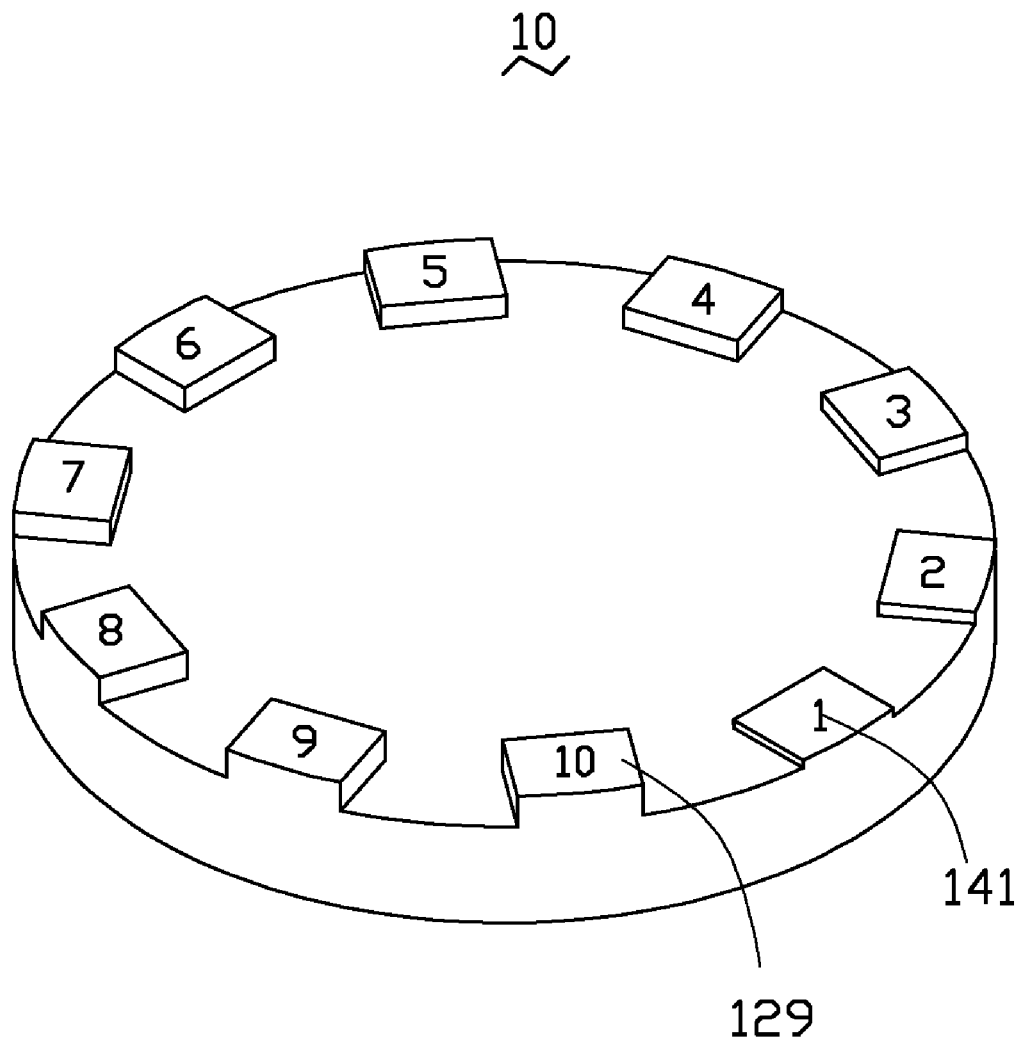
FIG. 3 shows a schematic view of another exemplary embodiment of a thickness gauge.

It is to be understood, as shown in FIG. 3, each slot 128 also can be instead of a plurality of protruding portions 129 with different heights to form the measuring portions 14.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A thickness gauge comprising:
    a main body comprising an upper surface, a lower surface, and a peripheral surface connecting the upper surface to the lower surface; and
    a plurality of measuring portions defined along an edge of the main body, the upper surface defines a plurality of slots, the measuring portions formed between a bottom of each slot and the lower surface, each measuring portion having a different height, and a numerical pattern labeled in each slot corresponding to the height of the measuring portion.

2. The thickness gauge as claimed in claim 1, wherein the depth of each slot orderly increase.

3. The thickness gauge as claimed in claim 1, wherein the thickness gauge is made of metal or plastic.

4. A thickness gauge comprising:
    a main body comprising an upper surface, a lower surface, and a peripheral surface connecting the upper surface to the lower surface; and
    a plurality of protruding portions with different heights positioned along an edge of the main body to form a plurality of measuring portions, the measuring portions formed between a top of each protruding portion and the lower surface, each measuring portion having a different height.

* * * * *